United States Patent [19]
Biskup

[11] Patent Number: 5,804,735
[45] Date of Patent: Sep. 8, 1998

[54] DIFFERENTIAL PRESSURE TRANSDUCER UNIT WITH AN OVERLOAD PROTECTION SYSTEM

[75] Inventor: Jürgen Biskup, Minden, Germany

[73] Assignee: Hartmann & Braun GmbH & Co. KG, Frankfurt, Germany

[21] Appl. No.: 796,931
[22] Filed: Feb. 7, 1997
[51] Int. Cl.⁶ .................................................. G01L 7/00
[52] U.S. Cl. .............................................................. 73/706
[58] Field of Search ............................. 73/706, 716, 717, 73/756

[56] References Cited

U.S. PATENT DOCUMENTS

| | | | |
|---|---|---|---|
| 3,628,092 | 12/1971 | Keto | 337/186 |
| 4,546,785 | 10/1985 | Sanderford | 73/706 |

*Primary Examiner*—William L. Oen
*Attorney, Agent, or Firm*—Michael M. Rickin

[57] ABSTRACT

A differential pressure transducer unit with an overload protection system to measure slight differential pressure in liquids and gases under high static compression loading, which unit can be connected by flanges to the differential-pressure lines. In order to reduce the number of pressure-tight electrical bushings and largely to dispense with continuously stressed flexible connection lines, the one or more sensors contained in the measuring element are constructed on a single, multi-pole electrical bushing, which form an integral unit with the latter. The measuring element constructed on the bushing is housed in a cutout of the measuring-element housing so that it can oscillate and is free from tension. The cutout is closed by the bushing in the manner of a plug.

5 Claims, 1 Drawing Sheet

U.S. Patent
Sep. 8, 1998
5,804,735
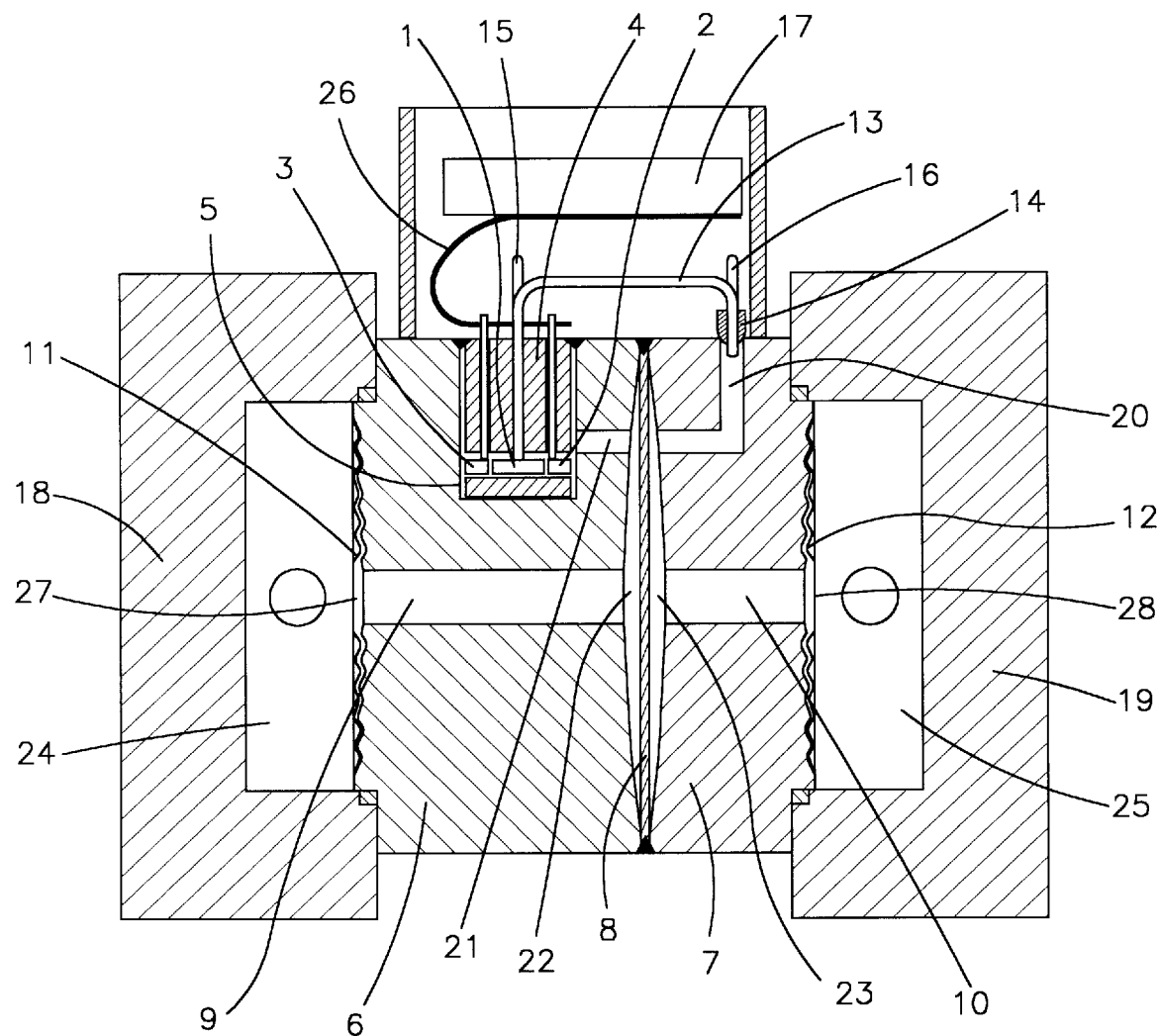
Fig.

DIFFERENTIAL PRESSURE TRANSDUCER UNIT WITH AN OVERLOAD PROTECTION SYSTEM

FIELD OF THE INVENTION

The invention relates to a differential pressure transducer unit with an overload protection system to measure slight differential pressure in liquids and gases under high static compression loading, which unit can be connected by flanges to the differential-pressure lines.

DESCRIPTION OF THE PRIOR ART

Devices of this type are known through prior use and from pertinent publications. Their underlying mechanical construction is described in detail in GB 2 065 893 and EP 0 143 702. Irrespective of the type of conversion of mechanical pressure/differential-pressure signals into equivalent electrical variables, in accordance with both prior publications, an essentially cylindrical central body is provided, which is enclosed between two identical shell-shaped caps using appropriate sealants. These caps are screwed together by a plurality of bolts which are arranged radially and are mechanically prestressed. The mechanical prestressing of the bolts is selected so as to avoid any pressure loss on the central body under maximum permissible static compression loading.

As a result of this mechanical prestressing, inherent in the principle, which varies according to the individual device, mechanical prestressing of the central body occurs, which brings about an offset or a deformation of the characteristic, dependent on the prestressing, of the measuring or overload diaphragm extending over a center-plane of the central body. Furthermore, the required seals have to be adapted to the individual device in terms of their material composition is dependent on the process medium, and moreover they are subject to wear.

On the side of the central body, each cap has a cutout which is joined to flange connections via channels which are usually designed as bores. The center spacing of these channels at the flange connections is specified in standards.

In an asymmetrical position, the central body has a neck on which a top part is fastened, in which means are provided for converting, processing and displaying measured values in accordance with GB 2 065 893.

The large number of pressure-tight joints required in the known pressure measuring devices necessitates to a considerable extent precision machining on a plurality of individual parts.

Furthermore, a pressure measuring device is known from WO 88/02107, which comprises a cylindrical basic body on which tangential flange connections are provided on one side, between which the pressure sensor is located. Although this device has a small number of pressure-tight joints, it is, however, fixed in its manner of assembly by having a set mechanical assignment of the display means to the device position.

A particular problem in measuring devices of this type with an overload protection system, which is intended to protect the sensitive differential-pressure sensor in the event of a pressure drop on one side in which the static pressure is present as differential pressure, is the electrical connection of the sensor elements to means arranged downstream for processing measured values. For this purpose, a measuring transducer is known from the Hartmann & Braun list sheet 10/15-6.21, October 1992 issue, in which the measuring capsule surrounding the measuring element is suspended centrally with axial movement on an overload diaphragm of rotationally symmetrical circumference. The measuring element arranged on the overload diaphragm so as to be movable relative to the housing requires flexible connection lines, which are also actually stressed in their flexibility, and for each connection line at least two pressure-tight electrical bushings, one of which leads out of the measuring element and a further one leads out of the housing surrounding the pressure space.

In particular in the case of self-correcting differential pressure transducer units which, in addition to the differential-pressure sensor, also have an absolute-pressure sensor and a temperature sensor to compensate for pressure and temperature-dependent measuring errors, a high degree of complexity is required for the electrical connection technology. This high degree of complexity reduces the reliability of long-term operation. Therefore, it is desirable to reduce the number of pressure-tight electrical bushings in an overload-protected differential pressure transducer unit of the type described above and largely to dispense with flexible connection lines subjected to continuous stress.

SUMMARY OF THE INVENTION

A transducer unit for measuring differential pressure in a process medium. The transducer unit has a measuring element which has one or more sensors for providing measured values of said process medium. The measuring element is acted on by a measuring agent which is spatially separated from the process medium. The transducer unit also has an overload protection system for said measuring element and means for processing the measured values connected to the measuring element by pressure-tight electrical bushings. The one or more sensors constructed together on a single, multi-pole electrical bushing and form an integral unit.

DESCRIPTION OF THE DRAWING

The single drawing in a sectional illustration shows the main constituents of a differential pressure transducer unit embodied in accordance with the present invention.

DESCRIPTION OF THE PREFERRED EMBODIMENT(S)

The differential pressure transducer unit comprises a central subassembly which is made up of two insulation plates 6 and 7 with an overload diaphragm 8 located between them. The unit is preferably welded to be pressure-tight. The surfaces of the insulation plates 6 and 7 facing the overload diaphragm 8 are essentially of concave shape and, with the overload diaphragm 8, surround internal pressure-measuring agent chambers 22 and 23 located on both sides of the overload diaphragm 8. The outside surfaces of the insulation plates facing away from the overload diaphragm 8 are essentially of concave shape and are each welded to an insulation diaphragm 11 and 12, in each case forming an external pressure-measuring agent chamber 27 and 28.

The insulation plates 6 and 7 each have a central pressure-measuring agent duct to connect the respectively associated internal pressure-measuring agent chamber 22 and 23 to the respectively associated external pressure-measuring agent chamber 27 and 28. Each volume unit formed from an internal pressure-measuring agent chamber 22 or 23 and the associated external pressure-measuring agent chamber 27 or 28 and the associated pressure-measuring agent duct is filled separately with an essentially incompressible pressure-measuring agent.

This central subassembly is mounted between caps 18 and 19, forming pressure chambers 24 and 25 to supply the process pressures.

Furthermore, a measuring element 1, 2, 3 comprising sensors for differential pressure 1, absolute pressure 3 and sensor temperature 2 is provided, which is connected via a connection cable 26 to means 17 for processing measured values. In this case, the means 17 for processing measured values may be supplemented by means for displaying measured values. The measuring element 1, 2, 3 is mounted as a self-sufficient integral unit on an electrical bushing 4. An arrangement of this type is free from dynamically stressed electrical connections.

Provided for mechanical fastening is a cutout 5 in a measuring-element housing surrounding the measuring element 1, 2, 3, in which cutout the measuring element 1, 2, 3 is fastened so that it can oscillate and is free from tension. In this case, provision is made specifically for the measuring element 1, 2, 3 mounted on the electrical bushing 4 to be inserted into the cutout 5 without contact, the cutout 5 being closed by the electrical bushing 4 in the manner of a lid or plug.

Mechanical tensions of the measuring-element housing are advantageously absorbed by the electrical bushing 4, so that the measuring element 1, 2, 3 may be pivoted in the cutout 5, but in any case remains free from tension.

To supply the process pressures to the measuring element 1, 2, 3, an eccentrically located measuring duct 20 and 21 is provided in each insulation plate 6 and 7, through which duct pressure-measuring agent flows. The measuring duct 20 and 21 is connected at least indirectly to the measuring element 1, 2, 3.

In a particular refinement of the invention, provision is made for the insulation plates 6 and 7 to be of asymmetrical design in terms of their axial extent, and for the thicker insulation plate 6 to have the cutout 5 for the measuring element 1, 2, 3. In this case, the measuring duct 21 in the insulation plate 6 is a direct connection of the associated internal pressure-measuring agent chamber 22 to the interior of the cutout 5, so that the measuring element 1, 2, 3 is flushed by the pressure-measuring agent in the cutout 5. A tube 13, which is passed through the bushing 4, is provided to connect the measuring element 1, 2, 3 to the measuring duct 20 in the insulation plate 7. In this case, the first side of the differential-pressure sensor 1 is loaded by the pressure-measuring agent surrounding the sensor with the process pressure from the pressure chamber 24 of the cap 18. The second side of the differential-pressure sensor 1 is connected by the tube 13 via a flange 14 welded to the insulation plate 7 and is loaded with the process pressure from the pressure chamber 25 of the cap 19.

The absolute-pressure sensor 3 is flushed completely by the pressure-measuring agent surrounding the insulation plate 6, and it measures the absolute pressure in the pressure chamber 24. The temperature sensor 2 measures the temperature in the direct vicinity of the absolute-pressure sensor 3 and the differential-pressure sensor 1. The measuring element 1, 2, 3 is filled with a fluid acting as a pressure-measuring agent via filling connections 15, 16 assigned in each case to a pressure space.

Furthermore, provision may be made for bolts 9 and 10 to be inserted into the pressure-measuring agent ducts, forming an annular gap. The bolts 9 and 10 are welded to the insulation plates 6, 7 on the side facing the overload diaphragm 8. This annular gap between the bore and the bolts prevents flames from penetrating into the pressure chambers 24 and 25, filled with process gas and surrounded by the caps 18 and 19, in the event of an explosion in the interior of the measuring transducer.

The sensors 1, 2 and 3 are fastened on the bushing 4 and are not moved with the overload diaphragm 8. This obviates the need for movable electrical connections between the sensors 1, 2 and 3 and the means 17 for processing measured values. Moreover, only a single pressure-tight electrical bushing 4 is required. As a result, the electrical connections in the interior of the measuring element 1, 2, 3 can be reduced to a minimum, and there are fewer sealing points.

The overload diaphragm 8 consists of a simple flat circle. Additional unsymmetrical stresses in the overload diaphragm 8 due to joining, shaping or welding processes are avoided. Furthermore, no forces are transmitted to the sensors 1, 2, 3 via the overload diaphragm 8, as is the case in measuring transducers in which the sensors 1, 2, 3 form an integral unit with the overload diaphragm 8, or in which the sensors 1, 2, 3 are welded onto the overload diaphragm with the aid of a bushing.

The absolute-pressure sensor 3 records the static pressure of the process medium. The pressure-dependent errors of the differential-pressure sensor 1 are compensated by the signal for the static pressure. The temperature-dependent errors of the differential-pressure sensor 1 are compensated by the signal of the temperature sensor 2. The compensation is calculated by a processor contained in the means 17 for processing measured values. Any errors in the signal of the static pressure are likewise corrected, and the signal is output, if required, via signal lines (not illustrated).

The unit comprising the bushing 4 with the sensors 1, 2 and 3 can easily be tested prior to final assembly. Furthermore, the recording of the temperature in the vicinity of the sensors 1 and 2 is advantageous for avoiding dynamic temperature errors.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A transducer unit for measuring differential pressure in a process medium, comprising:

a) measuring element having one or more sensors for providing measured values of said process medium, said measuring element acted on by a measuring agent which is spatially separated from said process medium;

b) an overload protection system for said measuring element; and c) means for processing said measured values connected to said measuring element by pressure-tight electrical bushings;

said one or more sensors constructed together on a single, multi-pole electrical bushing and forming an integral unit.

2. The differential pressure transducer unit of claim 1 having a measuring element housing, wherein said measuring element is housed in a cutout of said measuring-element housing so that it can oscillate and is free from tension, said cutout being closed by said bushing in the manner of a plug.

3. The differential pressure transducer unit of claim 2, wherein said sensor means includes a differential pressure sensor for measuring said process medium differential pressure, and said measuring agent includes first and second agents, said first measuring agent supplied via a measuring duct in a manner flushing said measuring element in said cutout and said second measuring agent is fed to said differential pressure sensor through said bushing.

4. The differential pressure transducer unit of claim 2 wherein said overload protection system has an insulation plate, and said cutout is arranged in said insulation plate.

5. The differential pressure transducer unit of claim 3 wherein said overload protection system has an insulation plate, and wherein said cutout is arranged in said insulation plate.

* * * * *